April 22, 1924.
J. H. WILLIAMS
TIRE
Filed April 14, 1922
1,491,504
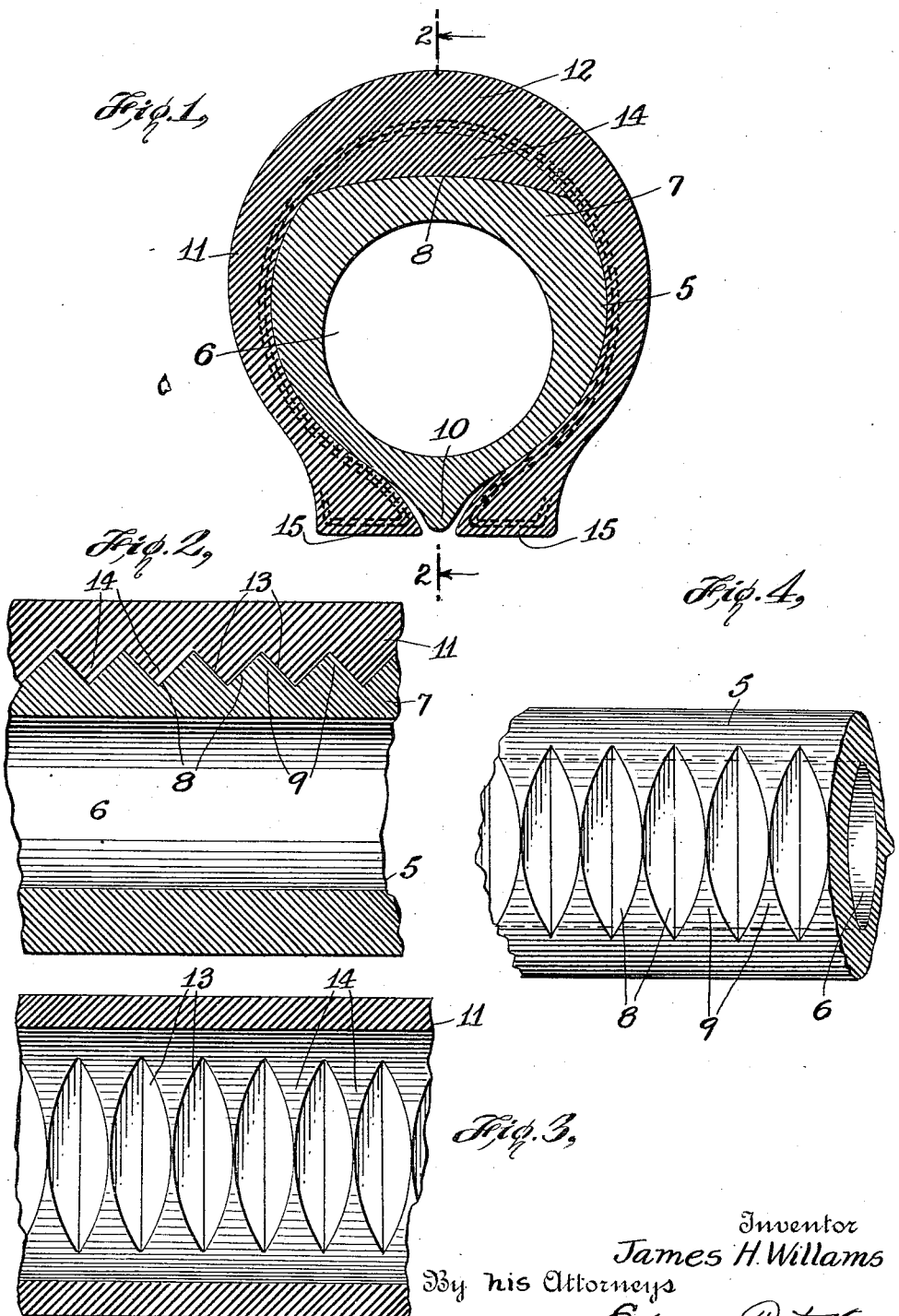
Inventor
James H. Willams
By his Attorneys
Edgar Tate Ho Patented Apr. 22, 1924.

1,491,504

UNITED STATES PATENT OFFICE.

JAMES H. WILLIAMS, OF GILBERT, ALBERTA, CANADA.

TIRE.

Application filed April 14, 1922. Serial No. 552,717.

*To all whom it may concern:*

Be it known that I, JAMES H. WILLIAMS, a subject of the King of Great Britain, and residing at Gilbert, Alberta, Canada, have invented certain new and useful Improvements in Tires, of which the following is a specification, such as will enable others skilled in the art to which it appertains to make and use the same.

This invention relates to tires and particularly to devices of this class employing an improved inner tube or automatic member, and the object of the invention is to provide a tire construction of the class specified in which the inner or pneumatic member of the tire as well as the tire or shoe member thereof are provided with means to prevent the creeping or slipping of one part on the other, or of the shoe member upon said pneumatic member as is customary and experienced in tires of the present construction; and with this and other objects in view the invention consists in a tire of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which;

Fig. 1 is a perspective sectional view through my improved tire construction;

Fig. 2 a partial section on the line 2—2 of Fig. 1;

Fig. 3 a longitudinal sectional view of a part of the shoe of a tire showing the inner face thereof; and, Fig. 4 a plan view of a part of the pneumatic member of the tire.

My improved tire construction consists principally in the provision of a pneumatic member 5 having an air chamber 6 adapted to be filled with air under pressure through the usual inflating device and the tread portion of this member is enlarged as shown at 7 and provided in the periphery thereof with a plurality of transverse recesses 8 which are V-shaped in form in cross section, and which form corresponding V-shaped projections 9 as clearly shown in Fig. 2 of the drawing, and the inner face of the member 5 is provided with a projecting portion 10 in the form of an annular flange which extends entirely around the member 5.

Employed in connection with the member 5 is a shoe 11, the tread portion 12 of which is enlarged and provided on the inner face thereof with a plurality of transverse recesses 13 forming corresponding projecting members 14 which are adapted to enter the recesses 8 of the member 5, and the projections 9 of the member 5 are adapted to enter the recesses 13 of the shoe 11, as clearly shown in Figs. 1 and 2 of the drawing.

The inner face portion of the shoe 11 or the separate members 15 thereof are fashioned to form a straight side or clincher tire to fit the different type rims in the usual manner, and the projection 10 of the member 5 fits between the members 15 of the shoe 11 as clearly shown in Fig. 1 of the drawing.

From the foregoing it will be apparent that the combination shoe and inflatable member such as herein shown and described and interlocked in the manner set out will prevent any possible slipping or movement of the member 5 in the shoe 11, or the shoe 11 upon the member 5 when the tire is in use thus eliminating the friction and heating caused by this slippage which is common in tires as now constructed.

It will be understood that I am not necessarily limited to the specific form of shoe 11 herein shown and described, nor to the specific form of the member 5, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A tire construction of the class described, comprising an outer or tread member, an inner inflatable member, said inner member being provided in the tread portion thereof with a plurality of spaced transverse recesses extending from one side of said member to the other, said recesses being substantially V-shaped in form in cross section and forming correspondingly spaced and transversely arranged projecting members, and the inner face of the outer member being provided with corresponding recesses and projections adapted to interlock with the recesses and projections of the inner member.

2. A tire construction of the class described, comprising an outer or tread member and an inner inflatable member, said inner member being provided in the tread portion thereof with spaced elongated and transversely arranged recesses, forming corresponding elongated, transversely arranged and spaced projecting members and the inner faces of the outer member being provided with corresponding recesses and projections adapted to interlock with the recesses and projections of the inner member.

3. A tire construction of the class described, comprising an outer or tread member and an inner inflatable member, said inner member being provided in the periphery of the tread portion thereof with spaced, elongated, straight and transversely arranged recesses, which are of greater depth centrally of the tread portion of said member and taper laterally at the opposite sides thereof, said recesses forming corresponding elongated and transversely arranged projecting members, and the inner face of the outer member being provided with corresponding recesses and projections adapted to interlock in the recesses or projections of the inner member.

In testimony that I claim the foregoing as my invention I have signed my name in presence of the subscribing witnesses this 4th day of April, 1922.

JAMES H. WILLIAMS.

Witnesses:
H. C. WHITEHOUSE,
W. J. GRAHAM.